(12) United States Patent
Liss

(10) Patent No.: US 11,141,860 B2
(45) Date of Patent: *Oct. 12, 2021

(54) METHOD FOR OPERATING AN AUTOMATICALLY MOVING CLEANING DEVICE AND CLEANING DEVICE OF THIS TYPE

(71) Applicant: Vorwerk & Co. Interholding GmbH, Wuppertal (DE)

(72) Inventor: Raphael Liss, Bonn (DE)

(73) Assignee: VORWERK & CO. INTERHOLDING GMBH, Wuppertal (DE)

( * ) Notice: Subject to any disclaimer, the term of this patent is extended or adjusted under 35 U.S.C. 154(b) by 268 days.

This patent is subject to a terminal disclaimer.

(21) Appl. No.: 16/472,287

(22) PCT Filed: Dec. 14, 2017

(86) PCT No.: PCT/EP2017/082730
§ 371 (c)(1),
(2) Date: Jun. 21, 2019

(87) PCT Pub. No.: WO2018/114550
PCT Pub. Date: Jun. 28, 2018

(65) Prior Publication Data
US 2021/0129335 A1 May 6, 2021

(30) Foreign Application Priority Data
Dec. 22, 2016 (DE) ...................... 10 2016 125 358.8

(51) Int. Cl.
*B25J 9/16* (2006.01)
*A47L 11/40* (2006.01)
(Continued)

(52) U.S. Cl.
CPC ......... *B25J 9/1676* (2013.01); *A47L 11/4011* (2013.01); *B25J 11/0085* (2013.01); *B25J 19/023* (2013.01); *A47L 2201/04* (2013.01)

(58) Field of Classification Search
CPC .............. A47L 2201/04; A47L 11/4011; A47L 2201/00; A47L 11/4061; A47L 2201/06;
(Continued)

(56) References Cited

U.S. PATENT DOCUMENTS 10,362,918 B2 * 7/2019 Hofner ................ A47L 11/4038
10,602,897 B2 * 3/2020 Strang .................. A47L 9/2805
(Continued)

FOREIGN PATENT DOCUMENTS

DE    10 2008 014 912 A1    9/2009
DE    10 2011 000 536 A1    8/2012
(Continued)

OTHER PUBLICATIONS

Yamaguchi et al., Moving Obstacle Detection using Monocular Vision, 2006, IEEE, p. 288-293 (Year: 2006).*
(Continued)

*Primary Examiner* — Mcdieunel Marc
(74) *Attorney, Agent, or Firm* — Collard & Roe, P.C.

(57) ABSTRACT

An automatically moving cleaning device includes a device housing, at least one obstacle detection device and a control device for controlling the cleaning device within an environment according to a detection result of the obstacle detection device, wherein the obstacle detection device is at least partially moveably mounted on the device housing, such that a detection region of the obstacle detection device is shiftable relative to the device housing. In order to optimize the detection of obstacles within the environment of the cleaning device, the control device is configured to shift the detection region of the obstacle detection device
(Continued)

relative to the device housing depending on a position and/or orientation of the cleaning device.

10 Claims, 4 Drawing Sheets

(51) Int. Cl.
    *B25J 11/00*        (2006.01)
    *B25J 19/02*        (2006.01)

(58) Field of Classification Search
    CPC ............... A47L 11/24; A47L 11/4044; G05D 2201/0203; G05D 1/0274; G05D 2201/0215; G05D 1/0214; G05D 1/0227; G05D 1/0248; G05D 1/0088; G05D 1/0044; G05D 1/0077; G05D 1/021; G05D 1/0234; G05D 1/024; G05D 1/028; G05D 1/0219; G05D 1/0238; G05D 1/0223; G05D 1/0257; G05D 1/0276; B25J 11/0085; B25J 19/023; B25J 19/022; B25J 9/1666; B25J 9/1697; B25J 9/1676; A01D 34/008; B62D 57/02; G01C 21/206; G01S 17/48; G01S 13/08; G01S 13/881; G01S 15/08; G01S 15/88; G01S 17/08; G01S 17/88; Y10S 901/01
See application file for complete search history.

(56) References Cited

U.S. PATENT DOCUMENTS

| | | |
|---|---|---|
| 2006/0293810 A1 | 12/2006 | Nakamoto |
| 2016/0313741 A1* | 10/2016 | Lindhe ................ G05D 1/0274 |
| 2018/0074509 A1 | 3/2018 | Hillen et al. |
| 2018/0095472 A1* | 4/2018 | Windorfer ............ G05D 1/0234 |
| 2019/0025061 A1* | 1/2019 | Helmich ................ G05D 1/024 |

FOREIGN PATENT DOCUMENTS

| | | |
|---|---|---|
| DE | 10 2015 105 211 A1 | 10/2016 |
| EP | 2 977 843 A1 | 1/2016 |
| WO | 2010/114235 A1 | 10/2010 |

OTHER PUBLICATIONS

Ma et al., A real-time rear view camera based obstacle detection, 2009, IEEE, p. 408-413 (Year: 2009).*

Souto et al., Morphologically intelligent underactuated robot for underwater hull cleaning, 2015, IEEE, p. 879-886 (Year: 2015).*

Nikko et al., Obstacle detection using a 2D LIDAR system for an Autonomous Vehicle, 2016, IEEE, p. 441-445 (Year: 2016).*

International Search Report of PCT/EP2017/082730, dated Mar. 13, 2018.

* cited by examiner

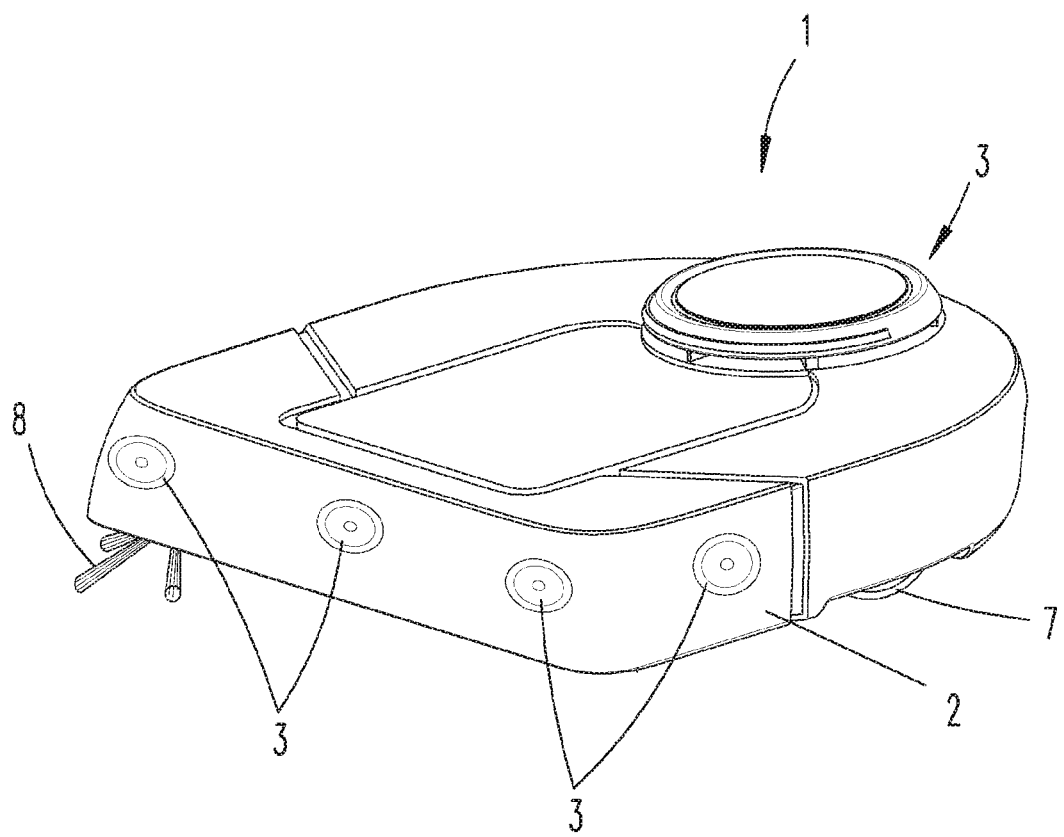

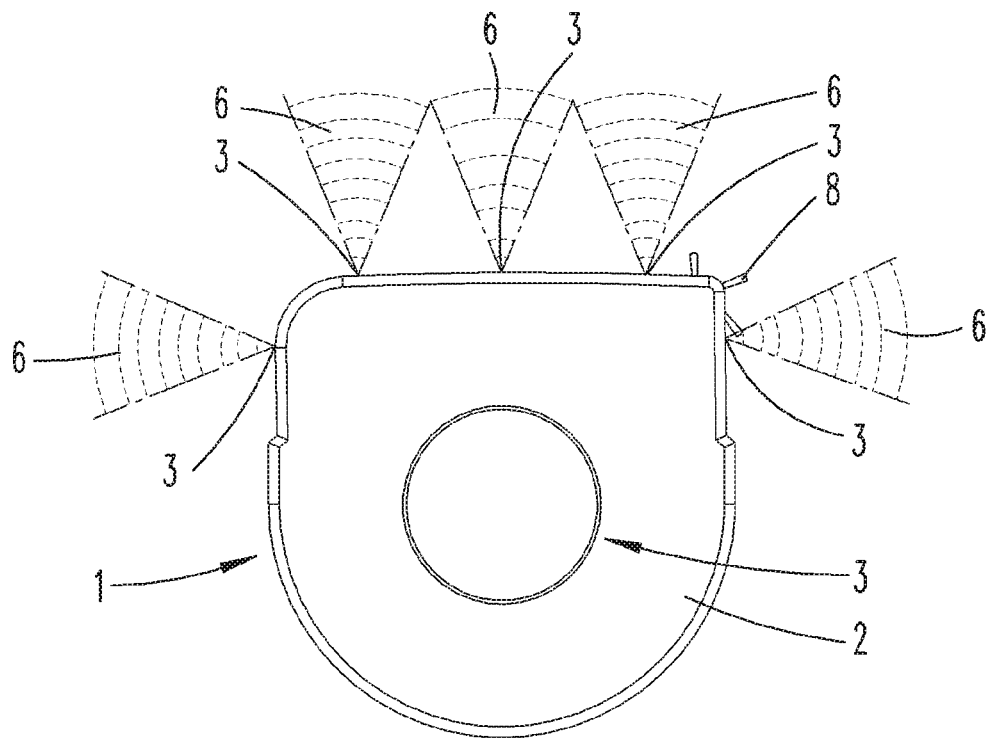
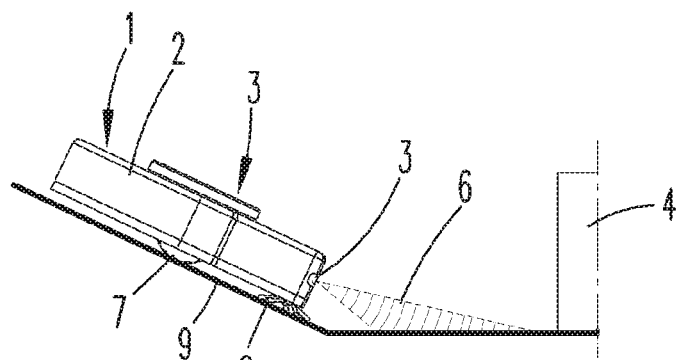
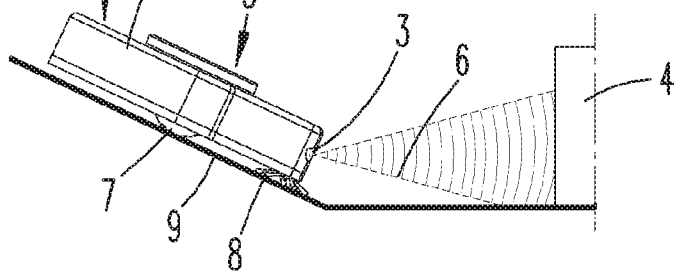

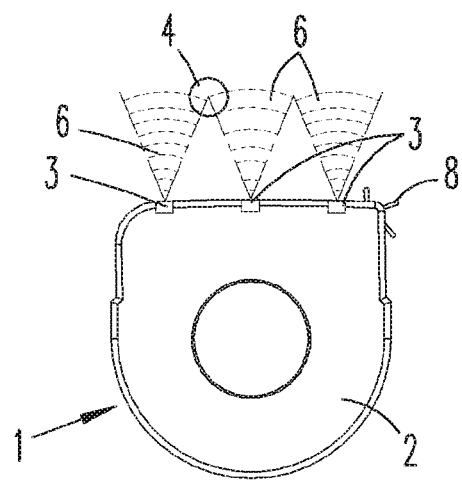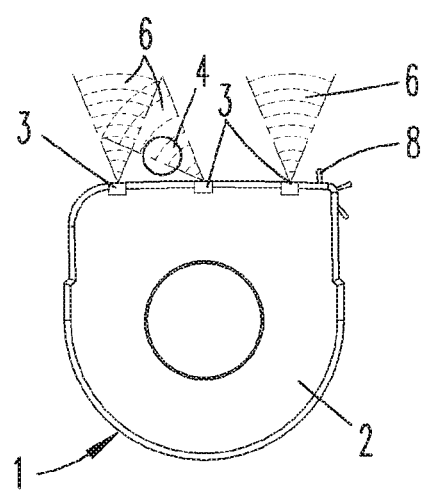

METHOD FOR OPERATING AN AUTOMATICALLY MOVING CLEANING DEVICE AND CLEANING DEVICE OF THIS TYPE

CROSS REFERENCE TO RELATED APPLICATIONS

This application is the National Stage of PCT/EP2017/082730 filed on Dec. 14, 2017, which claims priority under 35 U.S.C. § 119 of German Application No. 10 2016 125 358.8 filed on Dec. 22, 2016, the disclosures of which are incorporated by reference. The international application under PCT article 21(2) was not published in English.

FIELD OF TECHNOLOGY

The invention relates to an automatically moving cleaning device with a device housing, at least one obstacle detection device and a control device for controlling the cleaning device within an environment as a function of a detection result of the obstacle detection device, wherein the obstacle detection device is at least partially movably mounted on the device housing.

The invention further relates to a method for operating an automatically moving cleaning device, wherein at least one obstacle detection device detects obstacles in an environment of the cleaning device, wherein a position and/or orientation of the cleaning device within the environment is determined, and wherein the cleaning device moves within the environment as a function of a detection result of the obstacle detection device.

PRIOR ART

Automatically moving cleaning devices and methods for operating such cleaning devices are known in the art. For example, the cleaning devices can be vacuuming and/or mopping robots.

Such cleaning devices can move automatically within an environment, and in so doing perform cleaning tasks. For purposes of navigation and self-localization, the cleaning devices have an obstacle detection device, which delivers measured data for generating a map of the environment and prevents collisions with obstacles as the cleaning device moves.

For example, publications DE 10 2011 000 536 A1 and DE 10 2008 014 912 A1 show vacuuming and/or cleaning robots for cleaning floors. These robots are equipped with a distance sensor, for example to avoid a collision with an obstacle standing in a traveling path or the like. The distance sensor operates without contact, for example using light and/or ultrasound.

The distance sensor is arranged on the cleaning device either immovably, so that the latter always has a constant detection direction relative to the traveling direction of the cleaning device, or movably, so that the distance spacer performs a 360° distance measurement, for example by continuously rotating as the cleaning device moves.

Even though these cleaning devices have proven themselves in prior art, the detection region is either rigidly coupled with the device housing or is uniformly rotated, so that a dead angle could possibly arise.

SUMMARY OF THE INVENTION

Therefore, proceeding from the aforementioned prior art, the object of the invention is to further develop an automatically moving cleaning device in such a way that obstacles can be detected and avoided even more reliably.

Initially proposed for achieving this object is an automatically moving cleaning device, which has a control device set up to shift the detection region of the obstacle detection device relative to the device housing depending on a position and/or orientation of the cleaning device.

According to the invention, the obstacle detection device can now be adjusted to a current position and/or orientation of the cleaning device, wherein a detection region of the obstacle detection device can be varied in such a way that obstacles can be specifically detected at locations toward which the cleaning device is currently moving or will soon move toward. The detection region of the obstacle detection device is thus shifted corresponding to a current position and/or orientation of the cleaning device, in particular in the direction of a current or soon to follow traveling direction of the cleaning device. Depending on the type and structural design of the obstacle detection device, either the obstacle detection device as a whole can here be moved relative to the device housing, or only individual components of the obstacle detection device that influence the location of the detection region, for example only a sensor of the obstacle detection device. As a consequence, the obstacle detection device not only ensures a traveling path for the cleaning device in a conventional forward direction, but can promptly and reliably detect obstacles even while moving along curves. This results in a function for the movable obstacle detection device similar to an adaptive cornering light for motor vehicles. The detection region of the obstacle detection device can thus precede a current or soon to change direction of movement of the cleaning, so that obstacles can be detected and avoided early on.

In particular, it is proposed that the obstacle detection device have a transmitter for emitting a signal and a receiver for receiving a signal reflected by the obstacle, wherein the transmitter and/or receiver and/or a signal deflecting device allocated to the receiver can be moved relative to the device housing. For example, the obstacle detection device has the structural design of a distance sensor, which sends out a signal into the environment of the cleaning device and, if an obstacle is present in the emission direction, receives a reflected signal. A distance between the obstacle detection device or cleaning device and the measured obstacle can then be calculated from a travel time measurement, interference and/or triangulation measurement. In terms of moving the obstacle detection for displacing the detection region, it can be provided that only the transmitter, only the receiver or only the signal defecting device be displaced, provided this makes it possible to displace the detection region of the obstacle detection device. It is here only essential that the receiver can receive a signal that was emitted by the transmitter and reflected by an obstacle. In particular, a signal deflecting device can also be allocated to the transmitter and/or receiver. For example, this signal deflecting device can have a mirror, a prism, a beam splitter or other optical components, which can either exclusively or among other things deflect the direction of the signal on the way from the transmitter to the receiver or from the receiver to the transmitter. In particular, embodiments in which the transmitter and/or receiver and/or signal deflecting device can be moved relative to the device housing can here also arise. The signal hitting an obstacle can here be deflected by moving the signal deflecting device, for example by moving a mirror, as an alternative to moving the transmitter. In particular, this can be advantageous if the transmitter is immovably embedded in the device housing, can only be moved disadvantageously owing to size and/or electrical contacting, or the like.

It is proposed that the obstacle detection device have at least one ultrasound sensor and/or an optical sensor and/or a camera. The obstacle detection device thus functions based on ultrasound or light. In particular, the ultrasound sensor or optical sensor can be designed as a distance sensor, which as explained before has a transmitter and a receiver, which interact in such a way that an ultrasound or light signal sent out by the transmitter is reflected by an obstacle and then hits the receiver. However, the obstacle detection device can alternatively also have a camera, which is movably arranged on the device housing, and records an image of the environment of the cleaning device, for example which is compared with reference images so that an obstacle in the environment of the cleaning device can be detected. The obstacle detection device can basically also have various types of sensors at the same time, including a combination of different sensors, for example an ultrasound sensor, two optical sensors and a camera. If necessary, these can supplement each other in such a way as to optimize an accuracy of obstacle detection. For example, the optical sensor can be a CCD or CMOS chip, a photodiode or some other light-sensitive measuring device.

It is further proposed that the obstacle detection device can be displaced and/or pivoted relative to the device housing. In particular, it is here proposed that the obstacle detection device can be horizontally and/or vertically displaced and/or pivoted given an orientation of the cleaning device typical for a cleaning operation. The obstacle detection device or an element of the obstacle detection device, such as a transmitter, a receiver and/or a signal deflecting device, can thus be arranged on the device housing so that they can be horizontally and/or vertically displaced and/or pivoted, so that the latter can displace their detection region, similarly to an adaptive cornering light known for motor vehicles. This makes it possible to provide an active movement of the obstacle detection device not just for horizontal cornering, but also when vertically tilting the cleaning device, for example. As a result, the detection region of the obstacle detection device can also be adjusted given a vertical inclination, so that the obstacle detection device can always operate within the framework of a maximum possible detection region. This enables an overall optimal detection of the environment of the cleaning device, to also include in particular a detection with a lower number of obstacle detection devices. The control device of the cleaning device is here linked with the obstacle detection device in such a way that the movement of the obstacle detection device functions as a kind of adaptive cornering light. In particular, the control device can be set up in such a way that, while the cleaning device is negotiating curves, one or several obstacle detection devices look ahead in the direction of the curve. In addition, when a position sensor arranged on the cleaning device detects that the cleaning device is currently traveling down or looking down a ramp, an obstacle detection device can be set up in such a way as to continue to detect in a horizontal plane or detect up or down by up to 30° as a function of a current orientation of the ramp, wherein this angular range of up to +/−30° relates to the plane of the ramp. This makes it possible to prevent the obstacle detection device from being unable to detect an obstacle due to the inclination, and then once the cleaning device is again horizontally aligned behind the ramp, suddenly standing directly in front of the obstacle. In addition, the control device can be set up in such a way that the detection region of the obstacle detection device follows an obstacle moving relative to the cleaning device, so that the obstacle is always located within the detection region. As a result, objects, in particular while approaching the cleaning device, can no longer disappear in a dead angle. In particular, this makes it possible to optimally detect obstacles both at short range and far range. In addition, for example, the control device can also be set up to control a time and/or speed and/or direction of a movement by the obstacle detection device as a function of a time and/or speed of movement and/or direction of movement of the cleaning device. As a consequence, the obstacle detection device can be optimally controlled based on the situation and/or adjusted to a defined route of movement of the cleaning device.

It is further proposed that the cleaning device have another measuring device immovably arranged on the device housing in addition to the movable obstacle detection device. For example, this additional measuring device can be an ultrasound sensor or optical sensor fixedly arranged on the device housing. The immovable measuring device has a detection region, which always retains a constant position relative to the device housing of the cleaning device. In this configuration, the cleaning device can have one or even several movable obstacle detection devices and one or several additional measuring devices immovably arranged on the device housing, wherein, given what is usually an arrangement of multiple such devices, sensible partial quantities can have an active movability, while other devices are immovable, for example. In particular, for example, sensors arranged on the side of the cleaning device relative to a direction of movement or sensors centrally arranged at the front of the cleaning device in the direction of movement can be fixedly and immovably connected with the device housing. In particular, it makes sense that an immovable measuring device be arranged between two movable obstacle detection devices, wherein the detection region of the immovable measuring device covers a dead angle between the two movable obstacle detection devices.

It can be provided that the cleaning device have several obstacle detection devices, which can be moved independently of each other. This configuration makes it possible to combine the obstacle detection devices and measuring devices arranged on the cleaning device with each other in a highly variable manner, wherein only one such obstacle detection device advantageously moves based on the situation, which is suitable for detecting an obstacle in a current direction of movement or a soon to follow direction of movement of the cleaning device. By contrast, other obstacle detection devices or also the measuring devices already immovably arranged on the device housing anyway can be operated with a detection region that is fixed in location relative to the device housing.

Another embodiment proposes that several obstacle detection devices be together arranged on a holder that is movably mounted relative to the device housing, in particular rotationally mounted on the device housing. This configuration is used for the advantageous simultaneous and aligned movement of several obstacle detection devices. To this end, for example, several obstacle detection devices can be arranged on a holder, for example a housing part of the device housing, such as a bumper or the like, so that they are uniformly moved as well during a movement of the holder. As a result, a sensor system comprised of several obstacle detection devices can discover an overall movement. For example, a rotational movement of the overall system can be induced by means of an electric motor. In particular, for example, an annular holder can be placed and rotationally mounted around the device housing of the cleaning device, so that all obstacle detection devices also move simultaneously with the holder relative to the device housing.

In addition to the described cleaning device, the invention also proposes a method for operating an automatically moving cleaning device, in particular a method for operating a cleaning device described above, wherein at least one obstacle detection device detects obstacles in an environment of the cleaning device, wherein a position and/or orientation of the cleaning device within the environment is determined, and wherein the cleaning device moves within the environment as a function of a detection result of the obstacle detection device, wherein the obstacle detection device is moved relative to the device housing during and/or chronologically before a change in a direction of movement of the cleaning device in such a way that a detection region of the obstacle detection device essentially points in the new direction of movement, and/or that the obstacle detection device is moved in such a way upon detecting an obstacle that a detection region of the obstacle detection device follows the obstacle even given a continued movement of the cleaning device.

The method initially comprises procedural steps for generating maps and self-localizing the cleaning device within the generated map, which enables a navigation of the cleaning device within the environment. In particular, this method can involve a so-called SLAM (simultaneous localization and mapping) method. The invention now provides for several options. First of all, a movement route for the cleaning device within the environment can be predetermined, i.e., a path which the cleaning device is to take and possibly perform cleaning tasks in the process. Since the cleaning device, i.e., in particular its control device, thus knows the movement route, the movement of the obstacle detection device can already take place chronologically before the movement of the cleaning device. In a case where the movement route includes a curve, for example, the control device has information about the location within the environment where the cleaning device will move into the curve. Depending thereupon, the control device can then initiate a movement by one or several obstacle detection devices in such a way that the detection region of the respective obstacle detection device points in the new direction of movement early on. The detection region of the obstacle detection device especially advantageously precedes the new direction of movement of the cleaning device, so that the cleaning device is not surprised by suddenly emerging obstacles, but rather receives information in advance, i.e., before any change in its orientation, for example if an obstacle is suddenly standing in the planned movement route. As a consequence, the control device can stop the movement, in this case around a curve, of the cleaning device or cancel it in advance and pursue an alternative traversing strategy. In addition, an obstacle detection device that has detected an obstacle can be moved in such a way that its detection region follows the obstacle. Given obstacle detection devices that are immovable relative to the device housing, the obstacle would usually wander out of the detection region during the continued movement of the cleaning device and/or obstacle, for example in a dead angle, where the obstacle could no longer be detected. As a result of the inventive configuration, the detection region of the obstacle detection device now traces the movement of the cleaning device, so that the obstacle can continue to be detected. As a whole, then, the method for operating the cleaning device involves an individual displacement of the detection region of one or several obstacle detection devices, so that obstacles in the region of the cleaning device can be reliably detected. On the one hand, a detection region can here be delayed so as to precede the initiation of a driving maneuver, in particular around a curve, of a cleaning device, so that obstacles in the altered movement route can be detected, or on the other hand, a detection region can be displaced in such a way as to follow an obstacle moved relative to the cleaning device.

In addition, it is proposed that a time and/or speed and/or a direction of a movement of the obstacle detection device be varied as a function of a time and/or a speed of movement and/or a direction of movement of the cleaning device. A movement of the obstacle detection device, and thus also a displacement of a detection region of the obstacle detection device, can thereby be linked with functional parameters for the cleaning device drive, for example. For example, functional parameters of the drive here include a speed of movement and/or a direction of movement, for example which can be measured with a tachometer and/or via odometry. For example, it is possible that the movement of the obstacle detection device will take place faster if the cleaning device moves at a higher speed. In addition, the direction of movement of the obstacle detection device can be adjusted to a change in a direction of movement of the cleaning device, so that the detection region of the obstacle detection device is displaced toward the location where the cleaning device is currently or will shortly be moving. In addition, the time of a movement of the obstacle detection device can be controlled in such a way that the movement of the obstacle detection device takes place before the cleaning device performs a driving maneuver, for example negotiates a curve. As a consequence, the obstacle detection device can also detect obstacles in a direction of movement in which the cleaning device will only move in the near future. The links between the movements of the cleaning device and the movements of the obstacle detection device are here controlled by means of a control device, whose software has been correspondingly programmed.

Finally, it is proposed that a movement path of the cleaning device be determined in advance, wherein, during a subsequent movement of the cleaning device along the determined movement path, the obstacle detection device is moved chronologically before a determined change in a direction of movement in such a way that a detection region of the obstacle detection device points in the new direction of movement. In this especially preferred embodiment, a movement route within the environment is determined chronologically before a movement of the cleaning device. The movement route is characterized by a sequential arrangement of traveling maneuvers along a straight line and around corners, which each arise at a predetermined location and/or at a predetermined time within the movement plan. Depending on this determined movement route or a timetable corresponding thereto, a movement pattern can be generated for one or several obstacle detection devices, which influences a respective location and/or direction of detection of a detection region of the obstacle detection device in such a way that obstacles can be perceived chronologically in advance prior to a corresponding movement of the cleaning device, and the cleaning device does not even move to this location and/or in this direction of movement, for example, but rather around the obstacle.

In terms of an automatically moving cleaning device, the invention basically relates to any type of cleaning device that can automatically orient itself and move within an environment, and performs working activities in the process.

In particular robots are here intended, for example which perform a vacuuming and/or mopping task, process a floor or mow a lawn. In addition, however, such a cleaning device can also have a function making it possible to monitor a status of the environment of the cleaning device, for example in the sense of a smoke and/or burglar alarm.

BRIEF DESCRIPTION OF THE DRAWINGS

The invention will be explained in more detail based on exemplary embodiments. Shown on:

FIG. 1 is a perspective view from outside of a cleaning device,

FIG. 2 is a top view of a cleaning device,

FIG. 3a is the cleaning device according to FIG. 2 when traveling on a ramp prior to displacing a detection region of an obstacle detection device, FIG. 3b is the cleaning device according to FIG. 3a after the detection region has been displaced, FIG. 5a is a cleaning device while moving toward an obstacle before a detection region of an obstacle detection device is displaced, FIG. 5b is the cleaning device according to FIG. 5a after the detection region has been displaced.

DESCRIPTION OF THE EMBODIMENTS

Figure 4A:
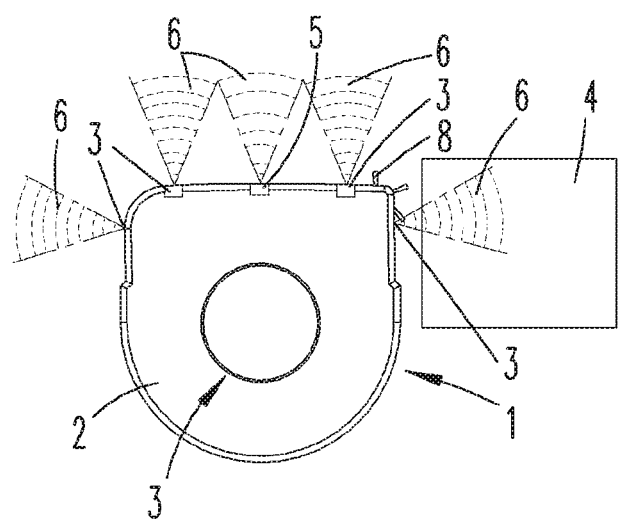
FIG. 4a is the cleaning device while traveling by an obstacle before displacing a detection region of an obstacle detection device.

FIG. 1 shows a cleaning device 1, which here is designed as an automatically moving vacuuming robot. The cleaning device 1 has a device housing 2, the bottom side of which facing a surface to be cleaned has electric motor-driven wheels 7 as well as an also electric motor-driven brush 8 protruding over the lower edge of a device floor. In the region of the brush 8, the cleaning device 1 further has a vacuuming mouth opening (not shown in any more detail), by means of which a motor-blower unit can aspirate air loaded with suction material into the cleaning device 1. The cleaning device 1 has a rechargeable battery (not shown) for supplying power to the individual electrical components of the cleaning device 1, for example for driving the wheels 7 and brush, as well as additionally provided electronics.

The cleaning device 1 has a plurality of obstacle detection devices 3, which are designed to detect obstacles within an environment of the cleaning device 1. Each obstacle detection device 3 has a detection region 6, within which present obstacles 4 can be detected. For example, a first obstacle detection device 3 is here a triangulation measuring device, which can measure distances to obstacles 4 within the environment of the cleaning device 1. A sensor of this obstacle detection device 3 specifically has a laser diode, whose emitted light beam can be guided out of the device housing 2 of the cleaning device 1 via a deflecting device and rotated around a rotational axis that is perpendicular in the depicted orientation of the cleaning device 1, in particular at a measuring angle of 360°. This enables an all-round distance measurement around the cleaning device 1. This obstacle detection device 3 can be used to measure the environment of the cleaning device 1 in a preferably horizontal plane, i.e., in a plane essentially parallel to the surface to be cleaned. As a result, the cleaning device 1 can be moved in the environment while avoiding a collision with obstacles 4. The measured data recorded by means of this obstacle detection device 3, which represent distances to obstacles 4 and/or walls in the environment, are used for generating a map of the environment. Odometry data for the wheels 7 can additionally be used for generating the area map, which serve to verify the data measured by means of the triangulation measuring device. As a consequence, the obstacle detection device 3 designed as a triangulation measuring device here performs two tasks at the same time, specifically scanning the environment of the cleaning device 1 on the one hand for putting together a map of the environment, and detecting obstacles 4 for purposes of collision avoidance on the other.

The cleaning device 1 further has several obstacle detection devices 3, which are designed as ultrasound distance sensors, and embedded in a frontal partial housing area of the device housing 2 relative to a primary direction of movement of the cleaning device 1. Four of these obstacle detection devices 3 are discernible in the illustration according to FIG. 1, wherein another obstacle detection device 3 is covered by the device housing 2 in the perspective shown. As a whole, the cleaning device 1 thus has five of these obstacle detection devices designed as ultrasound distance sensors, specifically three frontal ones on the device housing, and one respective obstacle detection device 3 laterally thereto, here essentially in two planes standing perpendicular to each other.

FIG. 2 shows a top view of the cleaning device 1, wherein the three frontal obstacle detection devices 3 and two lateral obstacle detection devices 3 are here each depicted with their detection region 6. In the situation shown, the detection regions 6 of the frontally arranged obstacle detection devices 3 each point toward the front, wherein the angle bisectors of the detection regions 6 are aligned essentially parallel to each other. For example, partial environmental areas at the front of the cleaning device 1 arise in this alignment, which are not covered by one or several detection regions 6. As a consequence, an obstacle 4 present there could not be detected by the obstacle detection devices 3, so that a collision with the obstacle 4 could take place, unless the latter had already been detected in advance while approaching the cleaning device 1. For example, this type of situation can arise if the cleaning device 1 rotates at a slow speed of movement or even while standing still.

Each obstacle detection device 3 has allocated to it an actuator, which can move the obstacle detection device in such a way as to displace its detection region 6. The entire obstacle detection device 3 need here not be moved, with it instead being enough to also move a signal deflecting device, for example, which deflects a signal sent out by the transmitter or guides a detection signal received by the receiver back to the transmitter. Such a signal deflection device can be a movable mirror or the like, for example. The movement of the obstacle detection device 3 or a corresponding partial area thereof is controlled by a control device of the cleaning device 1, here as a function of a movement of the cleaning device 1 and/or a detected presence of an obstacle 4 in the environment of the cleaning device 1.

FIGS. 3a and 3b show the cleaning device 1 as it travels down a ramp 9. FIG. 3a depicts a situation in which the detection region 6 of the obstacle detection device 3 has not yet been displaced, and a symmetry axis of the essentially conical detection region 6 of the obstacle detection device 3 points in a direction parallel to the plane of the ramp 9. Therefore, since not only the cleaning device 1 points downward tracking the ramp 9, but also the detection region 6 of the obstacle detection device 3, an obstacle 4 located behind the ramp 9 cannot be detected, since the latter is located outside of the detection region 6. If the cleaning device 1 thus exits the ramp 9 in this case, it is suddenly standing in front of the obstacle 4 without having detected it beforehand. In order to avoid this case, the detection region 6 of the obstacle detection device 3 is actively displaced. This case is shown on FIG. 3b. The detection region 6 of the obstacle detection device 3 was there displaced in such a way that the obstacle 4 now lies within the detection region 6. To this end, the control device of the cleaning device 1, for example by means of an inclination sensor, detected that the cleaning device 1 is no longer horizontally aligned, but rather is traveling down the ramp 9. The information of the inclination sensor is evaluated by the control device of the cleaning device 1, and processed for controlling a motor of the obstacle detection device 3 in such a way that the detection region 6 is displaced by an angular range that offsets the inclination of the ramp 9. This causes the detection region 6 to become displaced back in a direction corresponding to a frontal, horizontal direction of observation. The obstacle detection device 3 or a partial area thereof can here be set up in such a way as to compensate for rises or inclinations of +/−30°, for example.

Figure 4B:
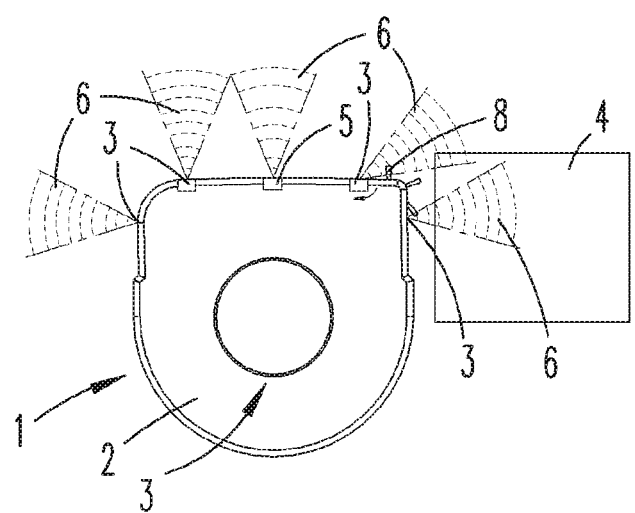
FIG. 4b is the cleaning device according to FIG. 4a after the detection region has been displaced.

FIGS. 4a and 4b show a cleaning device 1, which frontally has two obstacle detection devices 3 that can move relative to the device housing 2, and a measuring device 5 immovably arranged between the latter. In addition, a respective movable obstacle detection device 3 is arranged laterally on the device housing 2. The movable obstacle detection devices 3 can be moved in such a way that their detection region 6 is displaced in the direction of an obstacle 4.

In the situation illustrated on FIG. 4a, the cleaning device 1 travels past an obstacle 4, which thereby protrudes into the detection region 6 of an obstacle detection device 3 arranged laterally on the device housing 2 of the cleaning device 1. Information about the presence of the obstacle 4 within the detection region 6 is thereupon sent to the control device of the cleaning device 1, which then moves the nearest obstacle detection device 3 arranged frontally on the cleaning device 1 in such a way as to displace its detection region 6 in the direction of the obstacle 4. This situation is illustrated on FIG. 4b, wherein the obstacle 4 continues to protrude into the detection region 6 of the laterally arranged obstacle detection device 3 on the one hand and into the detection region 6 of the frontally arranged obstacle detection device 3 on the other. As the cleaning device 1 continues moving within the environment, the detection regions 6 of the obstacle detection devices 3 can be tracked analogously to a relative movement between the obstacle 4 and cleaning device 1 in such a way that the obstacle 4 always lies at least in one detection region 6 of an obstacle detection device 3.

Alternatively or additionally to the two exemplary embodiments shown above, it can be provided that an obstacle detection device 3 or several obstacle detection devices 3 be displaced chronologically in advance as a function of the parameters stored in the map of the environment. For example, a cleaning operation can be defined with a fixed traveling route for the cleaning device 1, which passes by specific obstacles 4, such as pieces of furniture, walls, doorframes or the like. The obstacle detection devices 3 can here each be controlled in such a way that their detection region 6 detects a known obstacle 4 lying at the edge of the traveling path. In addition, the control device of the cleaning device 1 can also control the obstacle detection device 3 in such a way that its detection region 6—for example shortly before the cleaning device 1 starts negotiating a curve—pivots in the direction of the curve, so that obstacles 4 that might be present in the direction of the traversing path altered by the curve can be detected in advance and, if necessary, circumvented. As a consequence, the control device of the cleaning device 1 can adjust the traversing path of the cleaning device 1 early on, so as to get around obstacles 4 not yet marked on the map.

Finally, FIGS. 5a and 5b show another embodiment in which the cleaning device 1 travels frontally toward an obstacle. The obstacle 4 is so small relative to the size of the cleaning device 1 and to the detection region 6 of the obstacle detection devices 3 that the latter could disappear between two adjacent obstacle detection devices 3 while approaching at a dead angle with the detection regions 6 aligned as on FIG. 5a. The control device of the cleaning device 1 would therefore not know how far the obstacle 4 is still away from the cleaning device 1. For this reason, the obstacle 4 is advantageously initially detected from a larger distance, e.g., of 20 cm, from those obstacle detection devices 3 into whose detection regions 6 the obstacle 4 protrudes. Based on information about which of the detection regions 6 of the obstacle detection devices 3 the obstacle 4 protrudes into, a movement of one or several obstacle detection devices 3 can be effected, so as to eliminate the dead angle between adjacent detection regions 6. In the illustration according to FIG. 5b, the middle obstacle detection device 3 of the three frontal obstacle detection devices 3 is displaced in such a way that their detection region 6 overlaps the dead angle. As the cleaning device 1 continues moving toward the obstacle 4, the obstacle 4 thus passes over into the detection region 6 of this pivoted obstacle detection device 3, so that information about the distance between the obstacle 4 and device housing 2 of the cleaning device 1 is always available.

REFERENCE LIST

1 Cleaning device
2 Device housing
3 Obstacle detection device
4 Obstacle
5 Measuring device
6 Detection region
7 Wheel
8 Brush
9 Ramp

The invention claimed is:

1. An automatically moving cleaning device (1) with a device housing (2), at least one obstacle detection device (3) and a control device for controlling the cleaning device (1) within an environment as a function of a detection result of the obstacle detection device (3), wherein the obstacle detection device (3) is at least partially movably mounted on the device housing (2), so that a detection region (6) of the obstacle detection device (3) is displaceable relative to the device housing (2), wherein the control device is set up to shift the detection region (6) of the obstacle detection device (3) relative to the device housing (2) depending on a position and/or orientation of the cleaning device (1), wherein the control device is configured to move the obstacle detection device (3) relative to the device housing (2) during and/or chronologically before a change in a direction of movement of the cleaning device (1) in such a way that a detection region (6) of the obstacle detection device (3) essentially points in the new direction of movement and/or that the obstacle detection device (3) is moved in such a way upon detecting an obstacle (4) that the detection region (6) of the obstacle detection device (3) follows the obstacle (4) even during a continued movement of the cleaning device (1).

2. The cleaning device (1) according to claim 1, wherein the obstacle detection device (3) has a transmitter for emitting a signal and receiver for receiving a signal reflected by an obstacle (4), wherein the transmitter and/or receiver and/or a signal deflecting device allocated to the transmitter and/or receiver can be moved relative to the device housing (2).

3. The cleaning device (1) according to claim 1, wherein the obstacle detection device (3) has at least one ultrasound sensor and/or an optical sensor and/or a camera.

4. The cleaning device (1) according to claim 1, wherein the obstacle detection device (3) can be displaced and/or pivoted relative to the device housing (2), wherein the obstacle detection device (3) can in particular be horizontally and/or vertically displaced and/or pivoted given an orientation of the cleaning device (1) typical for a cleaning operation.

5. The cleaning device (1) according to claim 1, wherein the cleaning device (1) has another measuring device (5) immovably arranged on the device housing (2) in addition to the movable obstacle detection device (3).

6. The cleaning device (1) according to claim 1, wherein the cleaning device (1) has several obstacle detection devices (3), which can be moved independently of each other.

7. The cleaning device (1) according to claim 1, wherein several obstacle detection devices (3) are together arranged on a holder that is movably mounted relative to the device housing (2), in particular rotationally mounted on the device housing (2).

8. A method for operating an automatically moving cleaning device (1) having at least one obstacle detection device (3) at least partially movably mounted on a device housing so that a detection region is displaceable relative to the device housing, and a control device for controlling the cleaning device (1) within an environment, the method comprising:

detecting with the at least one obstacle detection device (3) obstacles (4) in an environment of the cleaning device (1), determining a position and/or orientation of the cleaning device (1) within the environment, and shifting the detection region (6) of the obstacle detection device (3) relative to the device housing (2) with the control device, depending on a position and/or orientation of the cleaning device (1), wherein the cleaning device (1) moves within the environment with the control device, as a function of a detection result of the obstacle detection device (3), and wherein the obstacle detection device (3) is moved relative to the device housing (2) with the control device during and/or chronologically before a change in a direction of movement of the cleaning device (1) in such a way that the detection region (6) of the obstacle detection device (3) essentially points in the new direction of movement, and/or wherein the obstacle detection device (3) is moved in such a way upon detecting an obstacle (4) that a detection region (6) of the obstacle detection device (3) follows the obstacle (4) even given a continued movement of the cleaning device (1).

9. The method according to claim 8, wherein a time and/or speed and/or direction of a movement of the obstacle detection device (3) is varied as a function of a time and/or speed of movement and/or direction of movement of the cleaning device (1).

10. The method according to claim 8, wherein a traversing path of the cleaning device (1) is determined in advance, wherein, during a subsequent movement of the cleaning device (1) along the determined movement path, the obstacle detection device (3) is moved chronologically before a determined change in a direction of movement in such a way that a detection region (6) of the obstacle detection device (3) points in the new direction of movement.

* * * * *